INVENTOR:
SIEGFRIED J. ZUERKER,
BY Norman C. Fulmer
HIS ATTORNEY.

3,355,672
VOLTAGE REGULATOR CIRCUIT FOR EXTENDING BATTERY LIFE IN RADIOS AND THE LIKE
Siegfried J. Zuerker, Utica, N.Y., assignor to General Electric Company, a corporation of New York
Filed Feb. 15, 1965, Ser. No. 432,575
1 Claim. (Cl. 330—40)

ABSTRACT OF THE DISCLOSURE

Bias regulation circuitry for extending the lifetime of batteries in a radio receiver, the circuitry including a transistor having its base and collector electrodes connected directly together and a pair of resistors serially connected across the emitter and collector electrodes to provide a regulated bias voltage at the junction between the pair of resistors.

---

Figure 1:
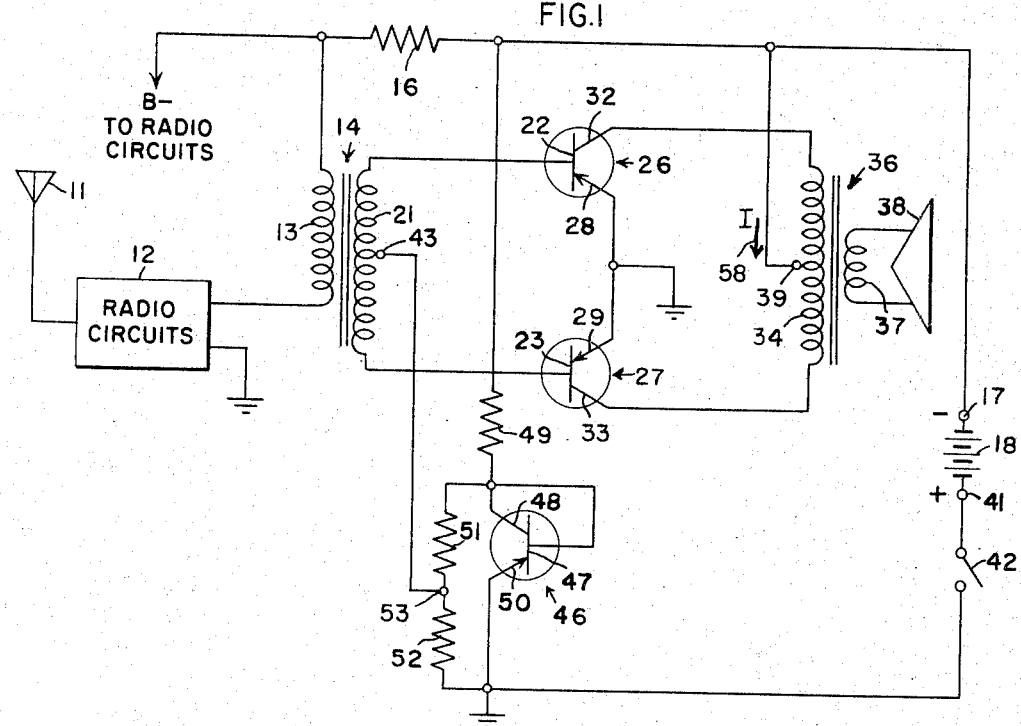

This invention relates to battery-powered electrical circuits, such as radios or the like, and more particularly relates to an improved voltage regulator circuit for saving and extending the useful life of the battery.

The present invention is an improvement over that disclosed and claimed in patent application S.N. 339,816, filed Jan. 23, 1964, and assigned to the same assignee as the present invention.

The aforesaid co-pending patent application describes an advantageous voltage regulator circuit, employing a transistor, for extending battery life, and the circuit performs extremely well provided the transistor used in the voltage regulator circuit has characteristics falling within certain usual tolerances.

An object of the present invention is to provide an improved voltage regulator circuit.

Another object is to provide an improved voltage regulator circuit utilizing a transistor which may have a wide tolerance range of operating characteristics.

A further object is to provide an improved voltage regulator circuit capable of utilizing a transistor having a relatively low value of base-to-emitter leakage characteristic.

Additional objects will be apparent from the following disclosure and claim, and from the accompanying drawing.

The circuit of the invention comprises, basically and in its preferred embodiment, a transistor having base, collector, and emitter electrodes, means connecting the base electrode to the collector electrode, and a resistor connected to one of the emitter and collector electrodes to form a series circuit with the transistor. This series circuit is connected across the battery of a radio or the like electrical apparatus. A pair of resistors are connected in series across the collector and emitter electrodes of the transistor, and at the junction of this pair of resistors a stabilized voltage is obtained for biasing certain circuitry, such as an audio amplifier, so as to reduce the amount of current drawn by this circuitry from the battery when the battery voltage is relatively high (such as when the battery is fresh) to a value near the value of current drawn when the battery voltage is relatively low (such as near the end of useful battery life). This stabilized and lower average value of current consumption prolongs the useful life of the battery, and the circuit of the invention provides improved voltage regulation control over a wider range of battery voltage, and hence increases usable battery life, while at the same time permitting wider tolerance in the base-to-emitter leakage characteristic of the transistor used in the voltage regulator circuit.

Figure 2:
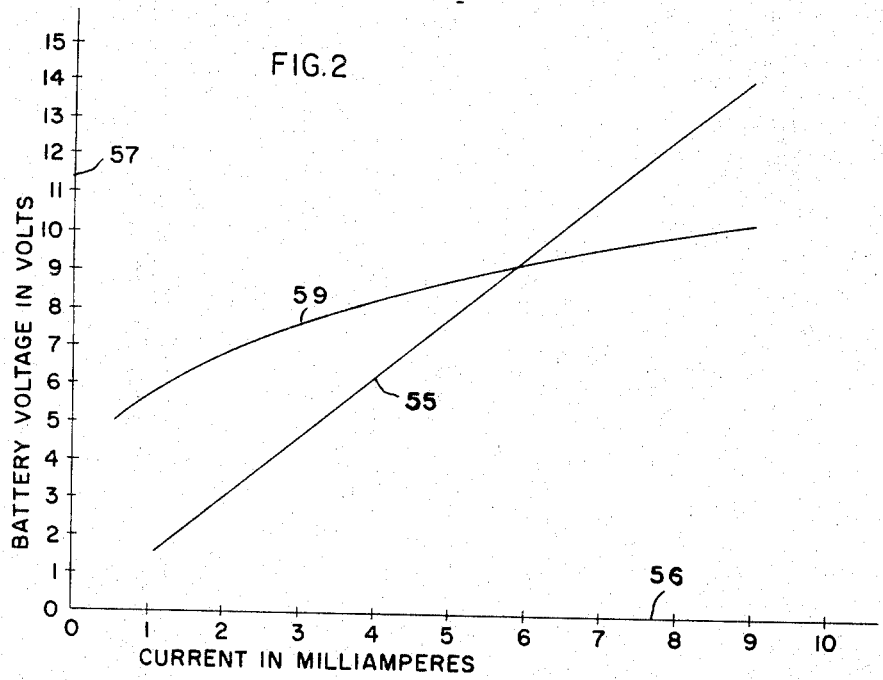

In the drawing,

FIG. 1 is an electrical schematic diagram of a preferred embodiment of the invention, and FIG. 2 is a plot of curves illustrating the functioning of the invention.

In FIG. 1, which shows the invention applied in a battery-operated radio circuit, an antenna 11 is connected to radio circuits 12 which may comprise a converter circuit, intermediate frequency amplifier, detector, and perhaps one or more stages of audio amplification. The audio frequency output signal of the radio circuits 12 is applied to an end of a primary winding 13 of an audio signal coupling transformer 14, the other end of the winding 13 being connected through a voltage dropping resistor 16 to a terminal 17 of a battery 18. A secondary winding 21 of the transformer 14 has the ends thereof respectively connected to base electrodes 22 and 23 of audio amplifier transistors 26 and 27, as shown. Emitter electrodes 28 and 29 of these transistors are connected to electrical ground, via resistor means if desired for obtaining some bias voltage.

Collector electrodes 32 and 33 of the transistors are respectively connected to the ends of a primary winding 34 of an audio output transformer 36 which has a secondary winding 37 connected to a loudspeaker 38. A center tap 39 on the primary winding 34 is connected to the battery terminal 17. The remaining terminal 41 of the battery 18 is connected, via an on-off switch 42, to electrical ground.

The circuit thus far described is conventional, and ordinarily the center tap 43 of the secondary winding 21 of the audio input transformer is connected to a suitable voltage source for biasing the base electrodes 22–23 of the audio amplifier transistors 26–27 which, in the circuits shown, are connected in push-pull operating arrangement in well-known manner. The transistor base biasing is usually achieved by means of a voltage divider arrangement of resistors connected across the battery 18 and to the input winding center tap 43, or by means of a voltage regulator bias circuit.

In accordance with the present invention, a biasing arrangement for the base electrodes 22 and 23 of the amplifier transistors comprises an improved voltage regulator circuit, comprising a transistor 46 having a base electrode 47 connected to a collector electrode 48, these electrodes being connected to the battery terminal 17 through a resistor 49.

The emitter electrode 50 of the transistor 46 is electrically grounded, whereby the transistor 46 and resistor 49 form a series combination across the battery terminals 17 and 41. A pair of resistors 51 and 52 are connected in series across the collector electrode 48 and the emitter electrode 50 of the transistor 46, as shown. The junction 53 of the pair of resistors 51, 52 is connected to the center tap 43 of the input winding 21. The voltage regulator transistor 50 functions as a grounded-emitter amplifier having maximum negative feedback due to the base-to-collector connection. For best voltage regulation, the collector current of the transistor 50 should lie above the knee of the well-known characteristic curve of base-emitter voltage vs. collector current. The circuit of the present invention differs from that of the aforesaid co-pending patent application, in the provision of the pair of series-connected resistors 51 and 52, and the connection of the junction thereof to the input winding center tap 43, instead of the biasing circuit and connection arrangement described in the aforesaid patent application.

As is described in the aforesaid co-pending patent application, the voltage regulator circuit comprising the transistor 46 and associated circuitry, functions generally by providing a constant regulated bias voltage to the base electrodes 22, 23 of the amplifier transistors 26, 27 such that these amplifier transistors draw less operating current through their collector-emitter paths from the battery 18 when the battery 18 is fresh and hence at a relatively high voltage, than would be the current drawn under similar circumstances if the base electrodes 22, 23 of the amplifier transistors were biased by means of a resistor network or by less efficient voltage regulator means than that of the present circuit. The aforesaid regulated bias voltage is such as to provide satisfactory operation of the push-pull transistor amplifier when the battery 18 has reduced voltage toward the end of its useful life.

An advantageous feature of the present invention will now be described with reference to the curve 55 in FIG. 2, which is a plot of collector current in milliamperes of the audio amplifier transistors 26 and 27, represented by the horizontal axis 56, versus battery voltage in volts, represented by the vertical axis 57. The amplifier transistor current in milliamperes, represented by the axis 56 of FIG. 2, is the current I entering the center tap 39 of output transformer winding 34, as indicated by the arrow 58 in FIG. 1. The battery voltage represented by the axis 57, is the voltage of the battery 18 at the terminals 17 and 41, and is nine volts for a fresh battery 18. As shown by the curve 55 in FIG. 2, the amplifier current I is approximately 6 milliamperes when the battery voltage is nine volts such as is the case with a fresh battery 18, and the amplifier current decreases, with decreasing battery voltage due to depletion of battery energy, to a current of 1.5 milliamperes when the voltage is 2.2 volts. At this lower current of 1.5 milliamperes, the amplifier circuit ceases to function properly because at this low value of current the cross-over distortion of the push-pull amplifier transistors 26 and 27 reaches 5 percent distortion. By way of comparison, curve 59 is a plot of amplifier current versus battery voltage without the present invention, i.e., with the resistor 51 having zero resistance so that the tap 43 of the input winding 21 is connected directly to the collector electrode 48 of the voltage regulator transistor 46, as in the circuit of the aforesaid co-pending patent application. As shown by the curve 59, without the present invention the amplifier current I decreases to the 1.5 milliampere useful operating limit when the battery voltage has decreased to only 6.3 volts. A comparison of the curves 55 and 59 readily shows that, with the present invention, the amplifier can function usefully and without undue distortion, during a longer battery life in which the battery may serve usefully until its voltage diminishes to a much lower value than is the case without the present invention.

Pertinent values of circuit components for the functioning according to the curve 55 of FIG. 2, are as follows:

| | |
|---|---|
| Transistors 26 and 27 | Type 2N408 |
| Transistor 46 | Type 2N705 |
| Battery 18 when fresh _____volts__ | 9 |
| Resistor 49 _____ohms__ | 3,300 |
| Resistor 51 _____do____ | 82 |
| Resistor 52 _____do____ | 100 |

For the plot of curve 59, the resistor 51 was short-circuited, whereby the center tap 43 of the input winding was connected directly to the collector electrode 48 of voltage regulator transistor 46. The exact values of the resistors 51 and 52 may be chosen, in part, with respect to the desired value of bias voltage at the junction 53.

The reason for the improved battery life achieved by the invention, as described above with reference to FIG. 2, is believed to be as follows. The voltage regulator transistor 46 has an inherent certain amount of leakage from base 47 to emitter 50 internally of the transistor 46 which undesirably varies and affects the emitter-base voltage and hence the voltage at the junction between resistors 49 and 51. In accordance with the present invention, however, the combined series resistance of resistors 51 and 52 is sufficiently high to bias the base 47 with respect to the emitter 50 to insure adequate current flow through the collector 48-emitter 50 path in the transistor 46 to render the voltage regulating action stable and relatively uninfluenced by the internal base-to-emitter resistance of the transistor 46. As mentioned before, the collector current should be above the knee of the base-emitter voltage-to-collector current characteristic for good control action. In many instances the resulting collector voltage will be too high for biasing the audio output transistors. This condition is self-corrected by the aforesaid voltage divider comprising resistors 51 and 52 which reduces the forward bias voltage supplied to the audio transistors to the proper value without affecting the basic control action of transistor 46. At the same time, the value of resistance of the resistor 52 is sufficiently low so that this resistance, which is in series with the input signal current path from electrical ground to the center tap 43 of the input winding, will not unduly attenuate the signal input current to the audio amplifier transistors 26 and 27. Thus, transistors for use as the voltage regulator transistor 46 may be chosen having a wider tolerance range of base-to-emitter leakage characteristic than could otherwise be employed in the circuit, thus achieving economy, and the circuit provides stabilized bias voltage over a wider range of battery voltage.

The aforesaid greater tolerance of leakage characteristic is all the more important and advantageous if the particular transistor chosen for the voltage regulator transistor 46 has a base-to-emitter leakage which is less (i.e. a greater impedance) than that of the audio amplifier transistors 26 and 27.

The invention also provides improved bias stabilization vs. temperature changes, and permits wider tolerances in values of resistors in the associated circuitry.

From the foregoing, it will be apparent that I have invented an improved voltage regulator circuit useful with many types of voltage sources, and that I furthermore have invented an improved circuit for extending battery life in battery-powered radios or the like.

While a preferred embodiment of the invention has been shown and described, various other embodiments and modifications thereof will be apparent to those skilled in the art, and will fall within the scope of invention as defined in the following claim. It is to be understood that the electrode designations of transistors are sometimes arbitrarily or erroneously marked on the transistors, or might not be marked at all, and therefore the designations "collector electrode" and "emitter electrode" as used herein and in the claim are intended to denote the conventional use of the electrodes, i.e. the collector electrode of a transistor is that which is reverse-biased in the circuit, and the emitter electrode is that which is forward-biased in the circuit. The pair of resistors 51 and 52 obviously could be replaced by a single potentiometer or tapped resistor, which would be the full equivalent of the pair of resistors 51 and 52.

What I claim is:

In an electrical circuit having an amplifier means adapted to draw current from a voltage source and having current-controlling electrode means, said voltage source being subject to voltage variation and said amplifier means drawing decreased current from the voltage source when the voltage thereof decreases, said amplifier means being characterized by a lower current limit for satisfactory functioning, an improved voltage regulator for extending useful operation of the amplifier means to lower values of voltage of said voltage source, said improved voltage regulator comprising a transistor having base, collector, and emitter electrodes, means connecting said base electrode directly to said collector electrode, resistance means connected to one of said collector and emitter electrodes to form a series combination with said transistor, said series combination being adapted to be connected across said voltage source, a pair of resistors connected in series across said collector and emitter electrodes, and means connecting the junction of said pair of resistors to said current-controlling electrode means thereby to apply a regulated bias voltage to said current-controlling electrode means.

References Cited

UNITED STATES PATENTS

| 2,934,641 | 4/1960 | Lin | 330—15 |
| 3,221,263 | 11/1965 | Worcester | 330—40 |
| 3,234,453 | 2/1966 | Klees et al. | 323—22 |

FOREIGN PATENTS

| 1,141,338 | 12/1962 | Germany. |
| 1,167,917 | 4/1964 | Germany. |
| 855,745 | 12/1960 | Great Britain. |

ROY LAKE, *Primary Examiner.*

J. B. MULLINS, *Assistant Examiner.*